US012603007B2

(12) United States Patent
Saito

(10) Patent No.: US 12,603,007 B2
(45) Date of Patent: Apr. 14, 2026

(54) DRIVER ASSISTANCE APPARATUS, DRIVER ASSISTANCE METHOD, AND NON-TRANSITORY RECORDING MEDIUM

(71) Applicant: SUBARU CORPORATION, Tokyo (JP)

(72) Inventor: Takato Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 39 days.

(21) Appl. No.: 18/969,376

(22) Filed: Dec. 5, 2024

(65) Prior Publication Data
US 2025/0095495 A1     Mar. 20, 2025

Related U.S. Application Data

(63) Continuation of application No. PCT/JP2023/011319, filed on Mar. 22, 2023.

(51) Int. Cl.
*B60W 50/14*     (2020.01)
*G01C 21/30*     (2006.01)
(Continued)

(52) U.S. Cl.
CPC ............. *G08G 1/166* (2013.01); *B60W 50/14* (2013.01); *G01C 21/30* (2013.01); *G06V 20/54* (2022.01);
(Continued)

(58) Field of Classification Search
CPC ...... B60W 50/14; B60W 40/02; G08G 1/166; G08G 1/04; G08G 1/16; G08G 1/167;
(Continued)

(56) References Cited

U.S. PATENT DOCUMENTS 8,179,241 B2 *   5/2012   Sakai ..................... G08G 1/164
                                                          340/436
9,934,689 B2 *   4/2018   Prokhorov ............ B60W 40/00
(Continued)

FOREIGN PATENT DOCUMENTS

JP      2001-101566 A      4/2001
JP      2004-114709 A      4/2004
(Continued)

OTHER PUBLICATIONS

Borges et al., "Integrating Off-Board Cameras and Vehicle On-Board Localization for Pedestrian Safety," in IEEE Transactions on Intelligent Transportation Systems, vol. 14, No. 2, pp. 720-730, Jun. 2013. (Year: 2013).*
(Continued)

*Primary Examiner* — Dino Kujundzic
(74) *Attorney, Agent, or Firm* — Rimon P.C.

(57) ABSTRACT

A driver assistance apparatus includes one or more processors. The processor acquires recognition area information and measurement result information from an environment recognizer. When the environment recognizer has detected a mobile body in an overlapping region between a blind spot area of the vehicle and a recognition area of the environment recognizer, the processor superimposes the recognition area information and information on the mobile body on map data, real space, or an image of the real space. When the environment recognizer has detected no mobile body, the processor determines whether a mobile body possibly present on a second traveling road is likely to enter a merging point between a first traveling road and the second traveling road at a time when the vehicle reaches the merging point. When the mobile body is likely to enter the merging point, the processor refrains from superimposing the recognition area information.

5 Claims, 11 Drawing Sheets

(51) Int. Cl.

| | |
|---|---|
| *G06V 20/54* | (2022.01) |
| *G06V 20/56* | (2022.01) |
| *G08G 1/04* | (2006.01) |
| *G08G 1/16* | (2006.01) |

(52) U.S. Cl.
CPC .............. *G06V 20/56* (2022.01); *G08G 1/04* (2013.01); *G08G 1/16* (2013.01); *G08G 1/167* (2013.01); *G06V 2201/08* (2022.01)

(58) Field of Classification Search
CPC ........ G01C 21/30; G06V 20/54; G06V 20/56; G06V 2201/08; G06V 20/58
See application file for complete search history.

(56) References Cited

U.S. PATENT DOCUMENTS

| | | | | |
|---|---|---|---|---|
| 10,943,487 | B2 * | 3/2021 | Mitsuya | B60K 35/23 |
| 11,332,132 | B2 * | 5/2022 | Petroff | G08G 1/166 |
| 12,401,767 | B2 * | 8/2025 | Tamagawa | H04N 7/181 |
| 2018/0144623 | A1 * | 5/2018 | Shirakata | G08G 1/09675 |
| 2018/0233049 | A1 * | 8/2018 | Ishii | G08G 1/162 |
| 2019/0371178 | A1 * | 12/2019 | Fukami | G08G 1/166 |
| 2020/0361482 | A1 * | 11/2020 | Choi | B60K 35/23 |
| 2020/0406747 | A1 * | 12/2020 | Sakai | B60R 1/24 |
| 2021/0067926 | A1 | 3/2021 | Hwang et al. | |
| 2021/0271249 | A1 * | 9/2021 | Kobashi | G06V 20/58 |
| 2023/0347877 | A1 * | 11/2023 | Shalev-Shwartz | G05D 1/81 |
| 2023/0410459 | A1 * | 12/2023 | Ikoma | G06V 10/22 |
| 2024/0326789 | A1 * | 10/2024 | Goto | B60W 30/143 |
| 2024/0336140 | A1 * | 10/2024 | Goto | G08G 1/0969 |

FOREIGN PATENT DOCUMENTS

| | | | |
|---|---|---|---|
| JP | 2008-046744 A | | 2/2008 |
| JP | 2008217813 A | * | 9/2008 |
| JP | 2019-202589 A | | 11/2019 |

OTHER PUBLICATIONS

JP 2008217813 A—machine translation (Year: 2008).*

International Search Report (with English translation) and Written Opinion dated Jun. 13, 2023, from corresponding International Application No. PCT/JP2023/011319, 8 pages.

* cited by examiner

[ FIG. 1 ]
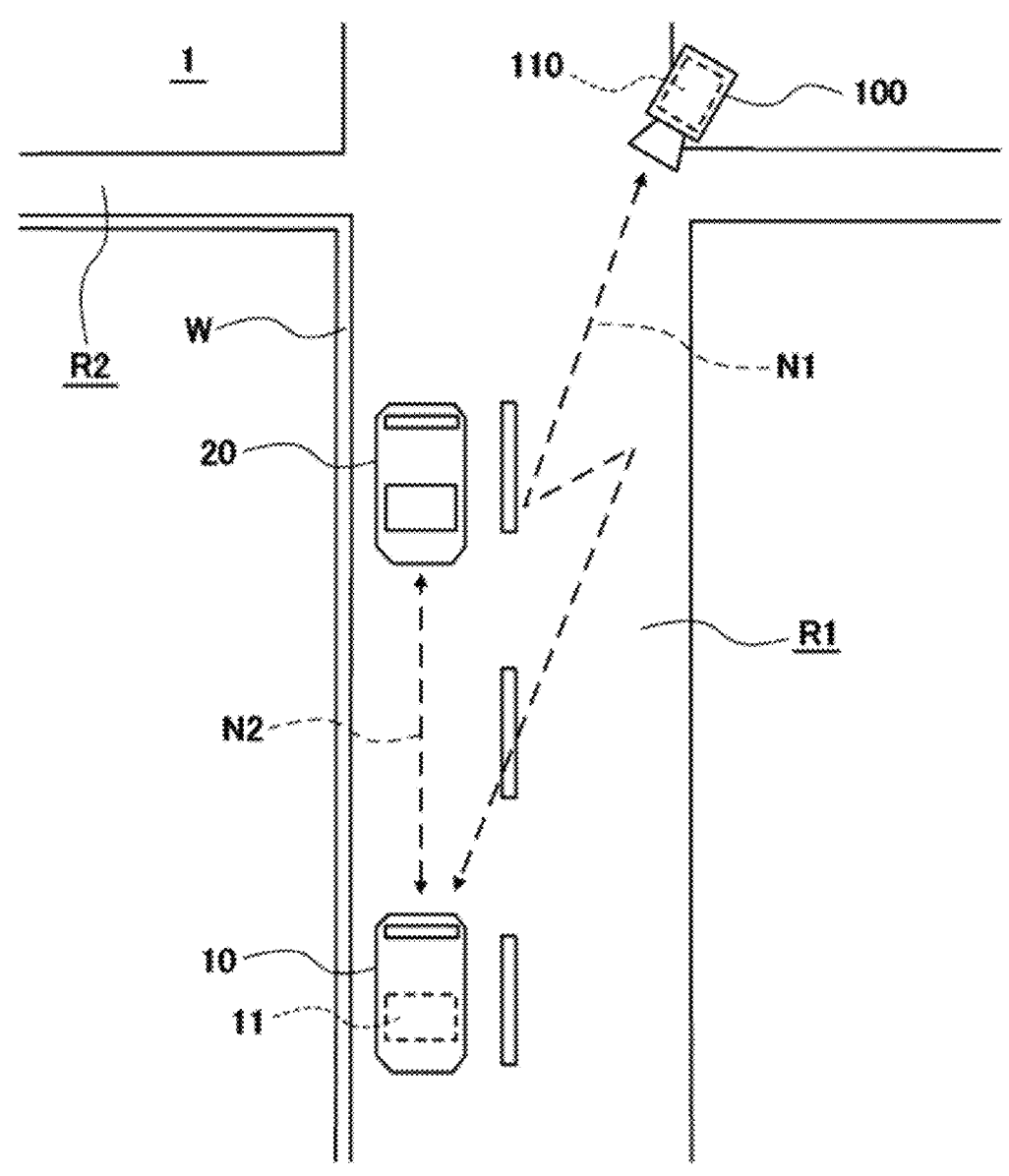

[ FIG. 2 ]
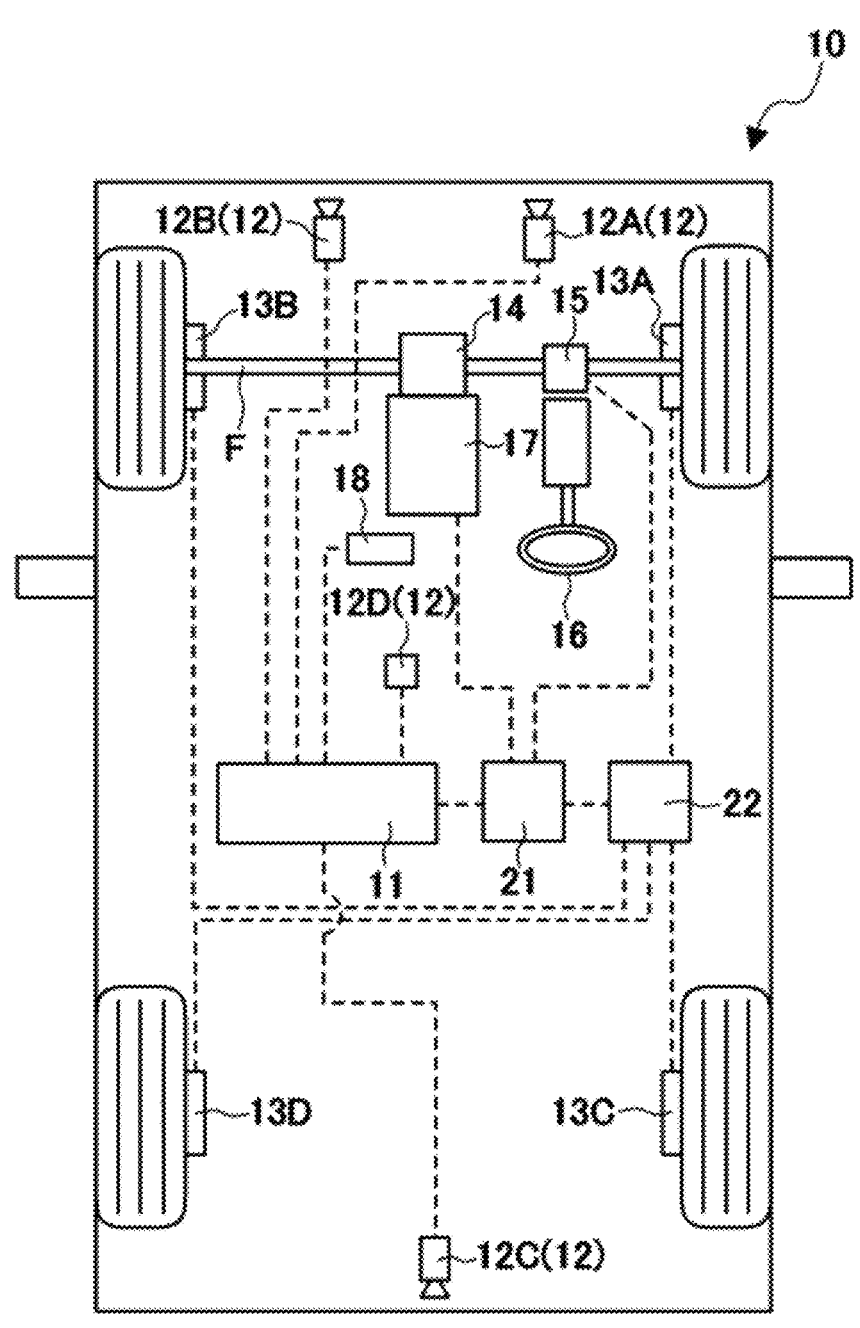

[ FIG. 3 ]
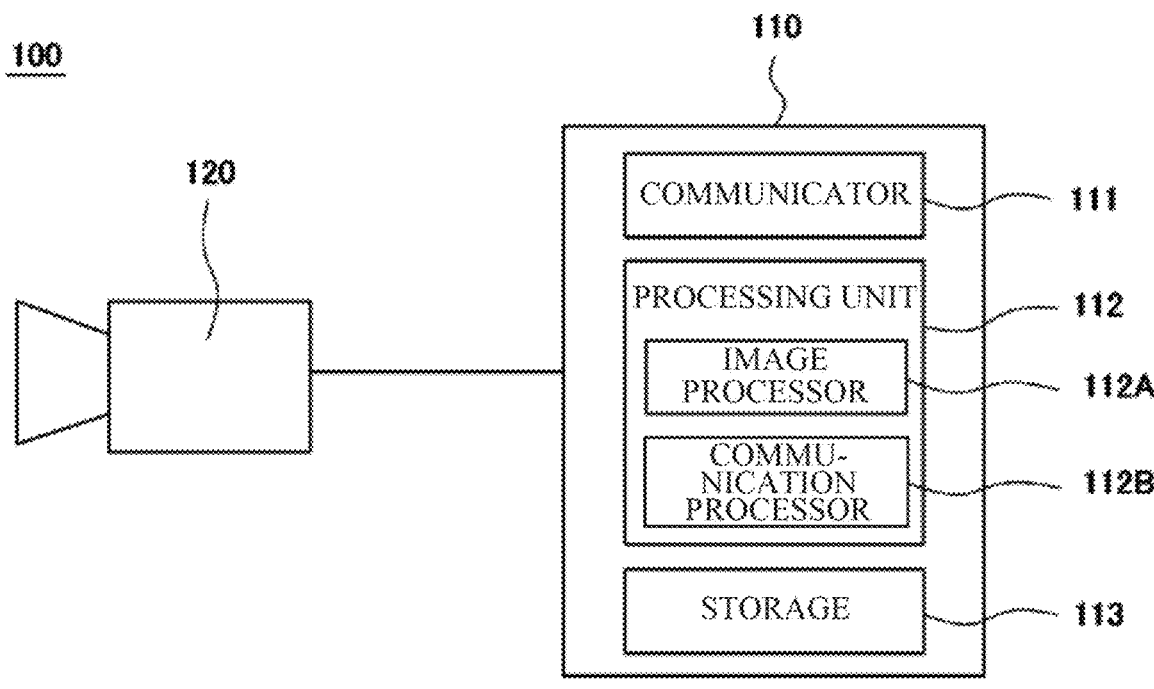

[ FIG. 4 ]
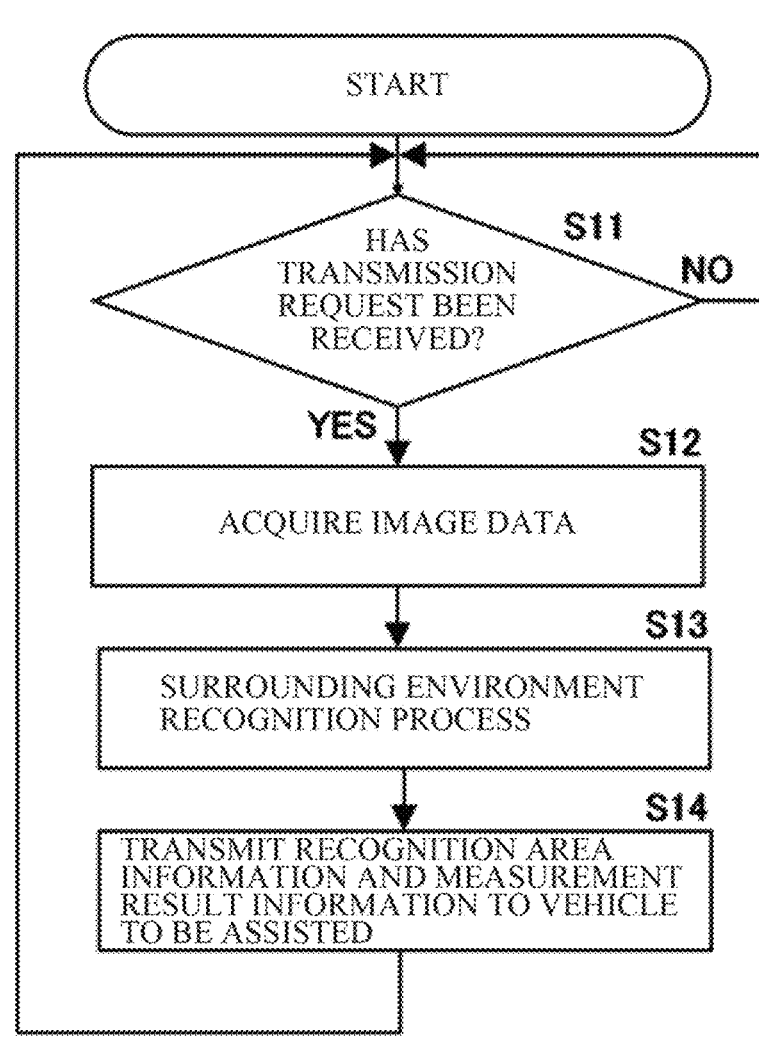
START
S11
HAS TRANSMISSION REQUEST BEEN RECEIVED?
NO
YES
S12
ACQUIRE IMAGE DATA
S13
SURROUNDING ENVIRONMENT RECOGNITION PROCESS
S14
TRANSMIT RECOGNITION AREA INFORMATION AND MEASUREMENT RESULT INFORMATION TO VEHICLE TO BE ASSISTED

[ FIG. 5 ]
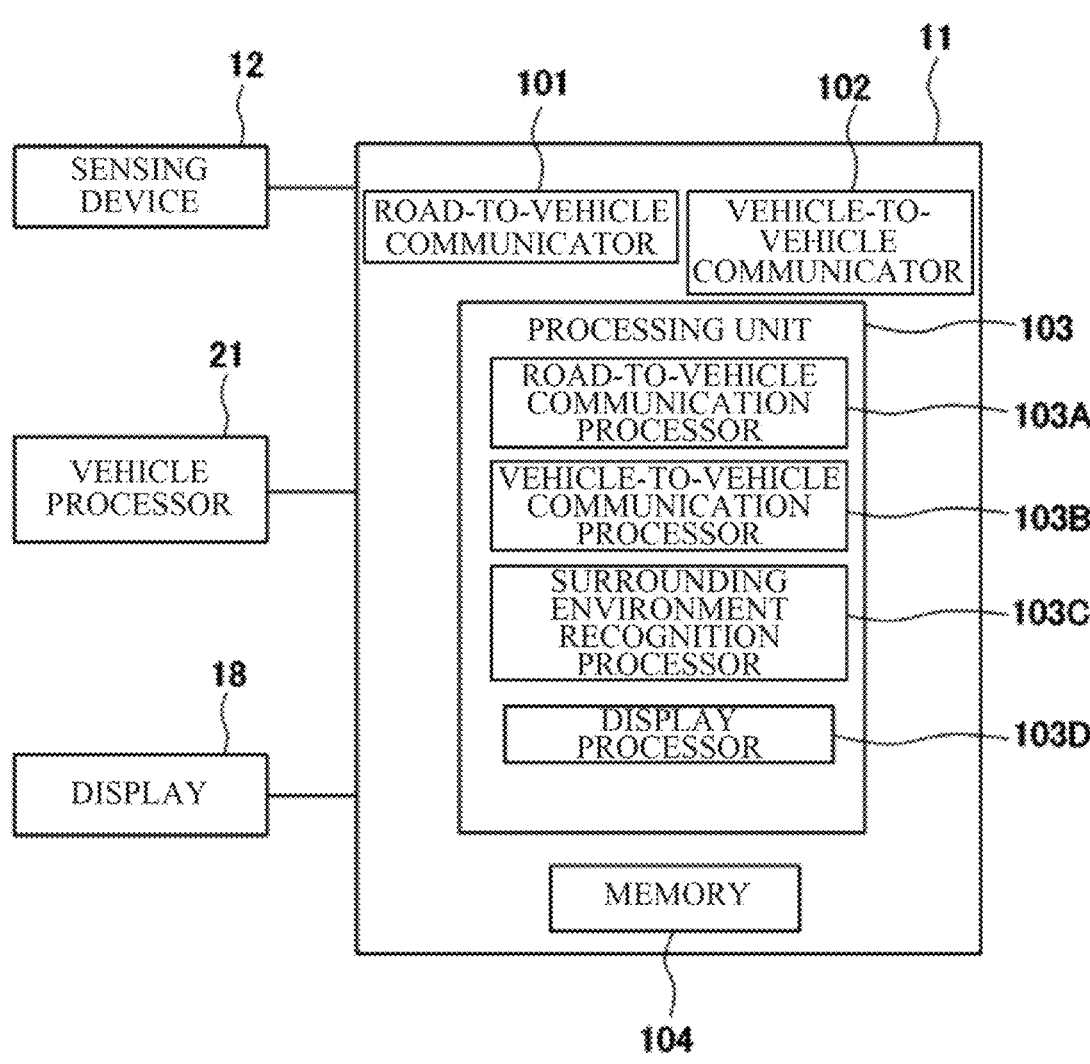

[ FIG. 6 ]
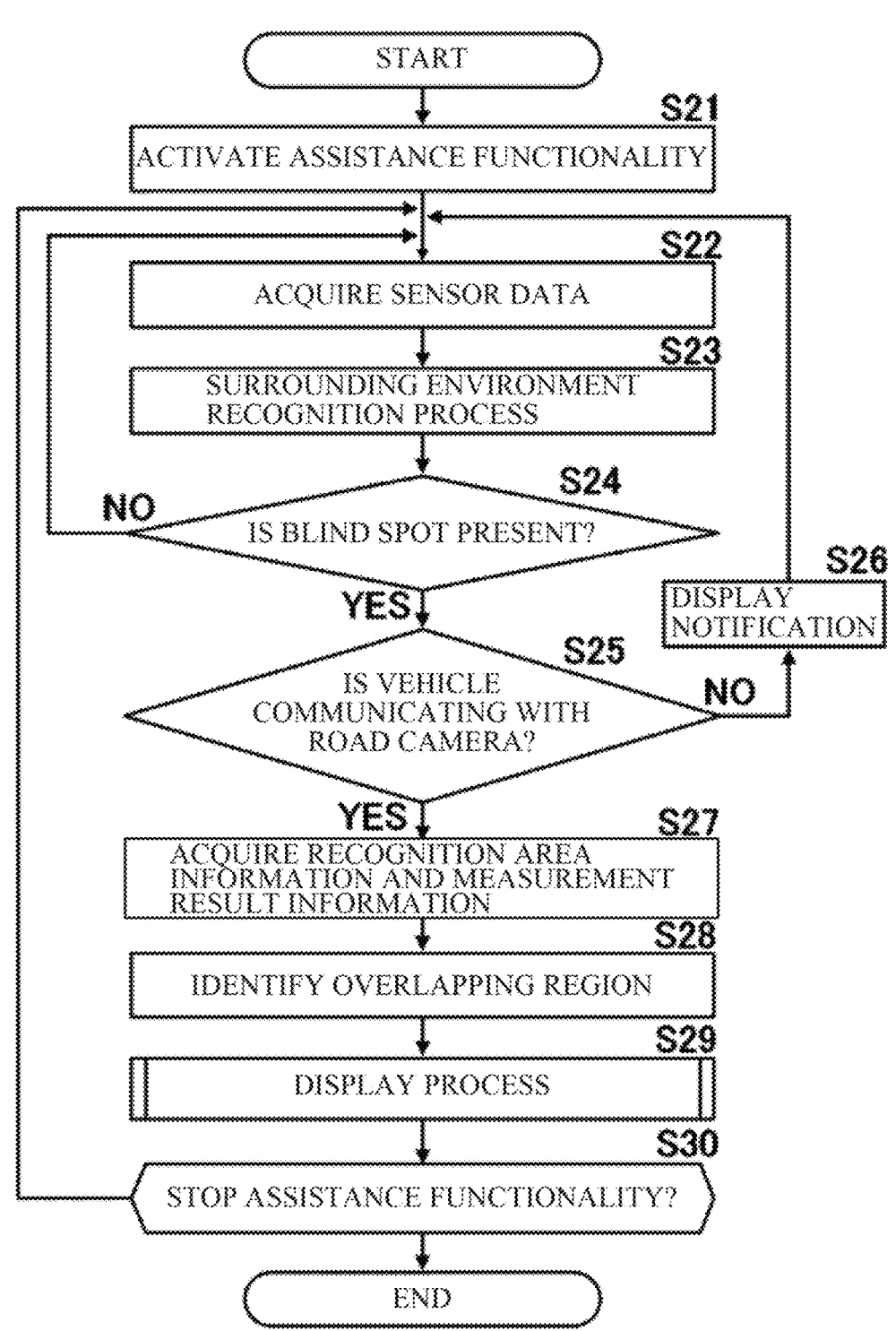

[ FIG. 7 ]
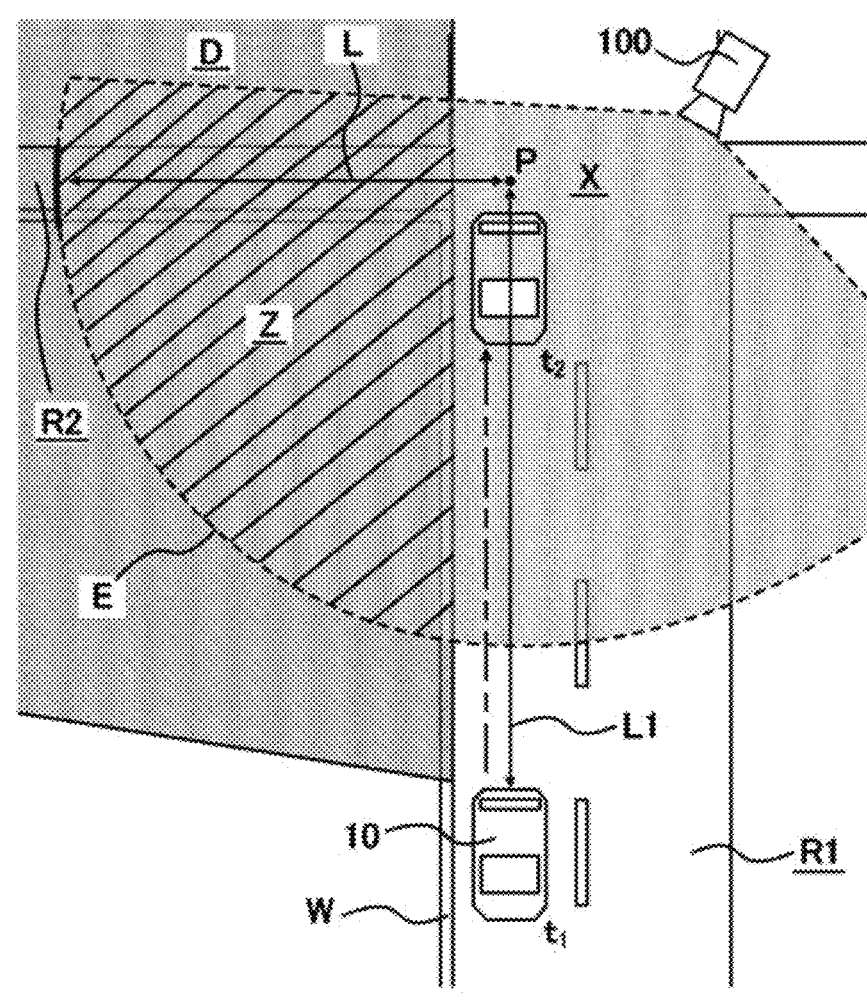

[ FIG. 8 ]
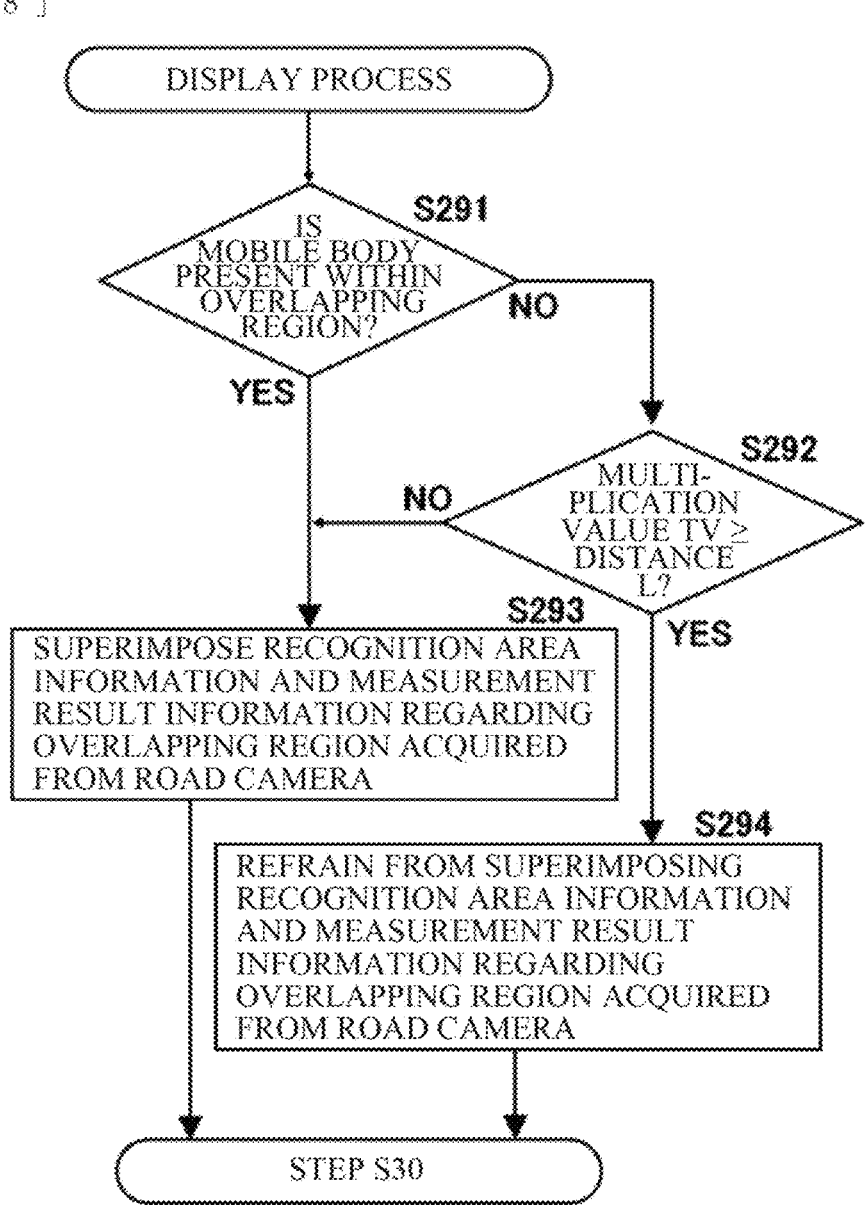

[FIG. 9]
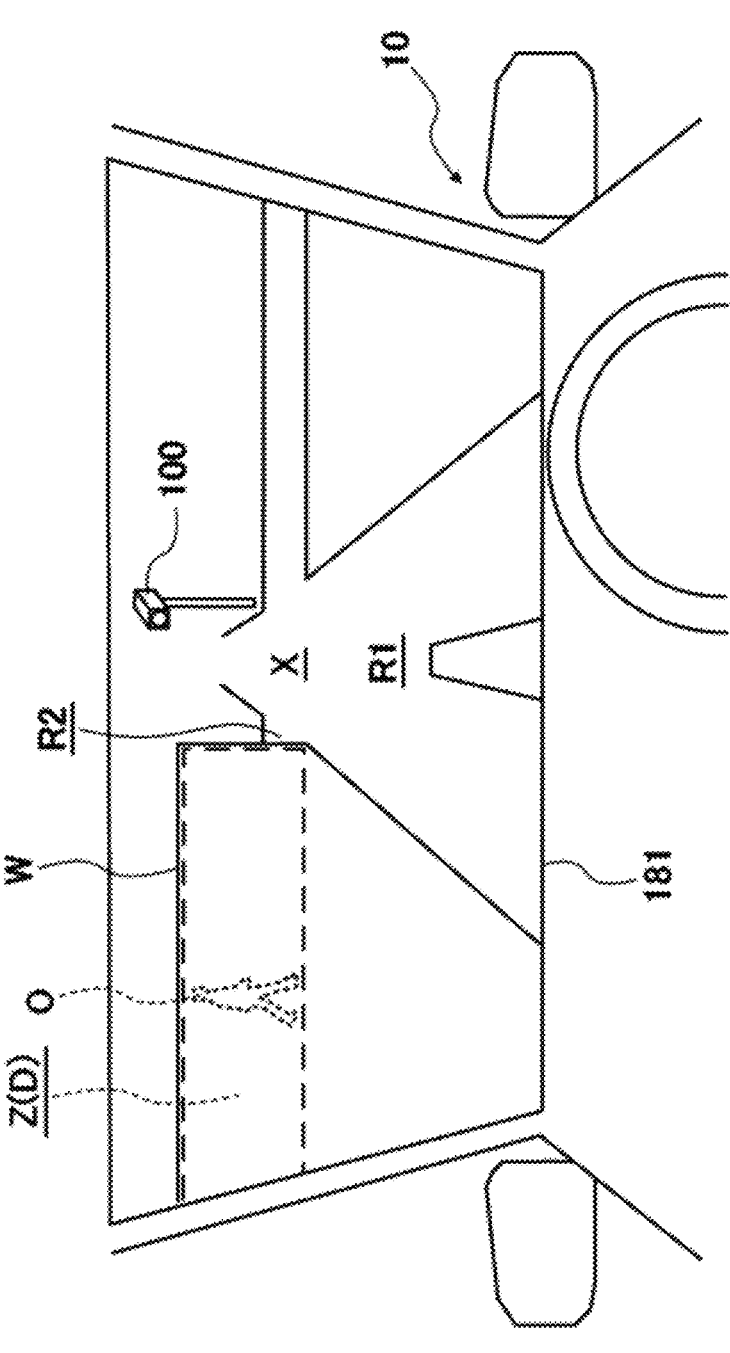

[ FIG. 10 ]
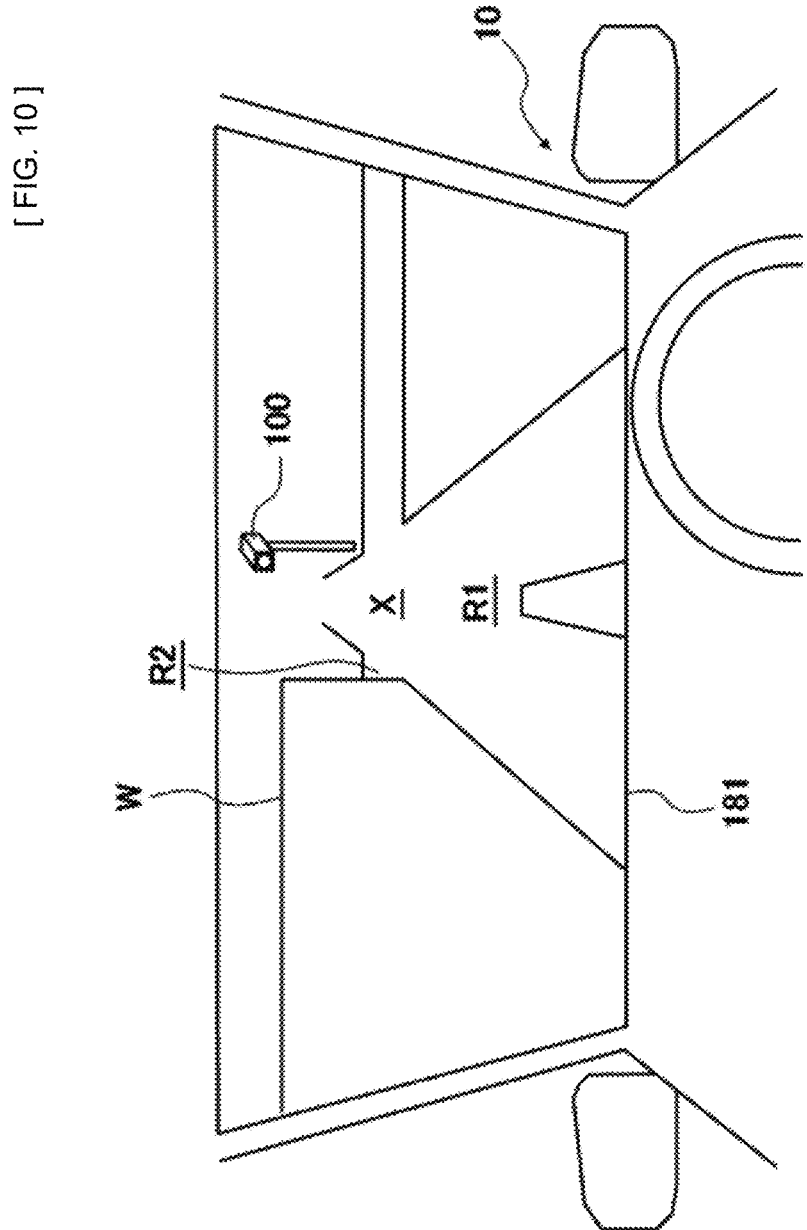

[ FIG. 11 ]
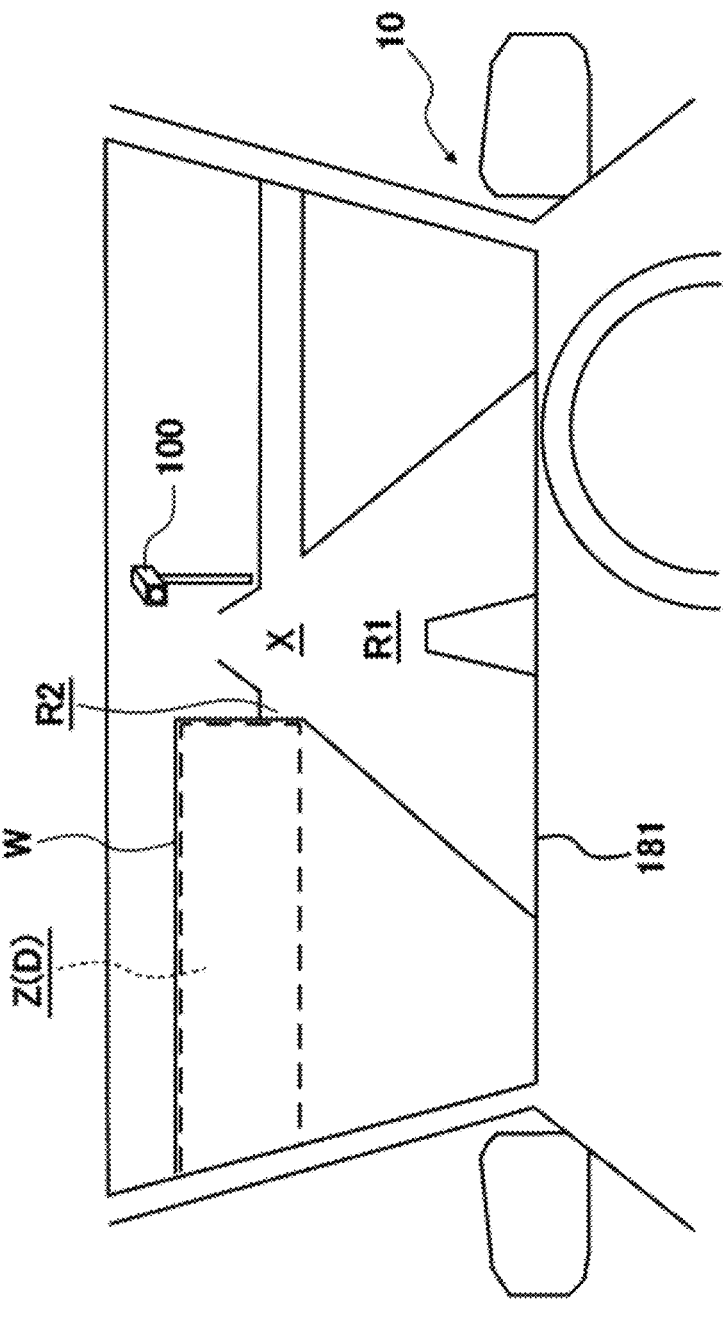

DRIVER ASSISTANCE APPARATUS, DRIVER ASSISTANCE METHOD, AND NON-TRANSITORY RECORDING MEDIUM

CROSS REFERENCE TO RELATED APPLICATIONS

This application is continuation of International Application No. PCT/JP2023/011319, filed on Mar. 22, 2023, the entire contents of which are hereby incorporated by reference.

BACKGROUND

The disclosure relates to a driver assistance apparatus, a driver assistance method, and a non-transitory recording medium.

In a known technique of avoiding traffic accidents such as contact at intersections, a target vehicle to be assisted acquires information detected by a sensing device such as a sensor or a camera of a vehicle other than the target vehicle via vehicle-to-vehicle communication or road-to-vehicle communication, and issues a notification such as a warning to a driver who drives the target vehicle. References are made to Japanese Unexamined Patent Application Publication (JP-A) Nos. 2004-114709, 2008-046744, and 2019-202589.

SUMMARY

An aspect of the disclosure provides a driver assistance apparatus configured to assist driving of a vehicle. The driver assistance apparatus includes one or more processors and one or more memories communicably coupled to the one or more processors. The one or more processors are configured to: acquire at least recognition area information and measurement result information from one or more environment recognizers outside the vehicle; when the one or more environment recognizers have detected a mobile body in an overlapping region between a blind spot area of the vehicle and a recognition area of the one or more environment recognizers, superimpose the recognition area information and information on the mobile body on map data, real space, or a captured image of the real space; when the one or more environment recognizers have detected no mobile body in the overlapping region, determine whether a mobile body possibly present on a second traveling road is likely to enter a merging point between a first traveling road on which the vehicle travels and the second traveling road merging into the first traveling road from an outside of the overlapping region at a time when the vehicle reaches the merging point; and refrain from superimposing the recognition area information on the map data, the real space, or the captured image of the real space when the mobile body possibly present on the second traveling road is determined to be likely to enter the merging point.

An aspect of the disclosure provides a driver assistance method of assisting driving of a vehicle. The driver assistance method includes: acquiring at least recognition area information and measurement result information from one or more environment recognizers outside the vehicle; when the one or more environment recognizers have detected a mobile body in an overlapping region between a blind spot area of the vehicle and a recognition area of the one or more environment recognizers, superimposing the recognition area information and information on the mobile body on map data, real space, or a captured image of the real space;

when the one or more environment recognizers have detected no mobile body in the overlapping region, determining whether a mobile body possibly present on a second traveling road is likely to enter a merging point between a first traveling road on which the vehicle travels and the second traveling road merging into the first traveling road from an outside of the overlapping region at a time when the vehicle reaches the merging point; and refraining from superimposing the recognition area information on the map data, the real space, or the captured image of the real space when the mobile body possibly present on the second traveling road is determined to be likely to enter the merging point.

An aspect of the disclosure provides a non-transitory computer readable recording medium containing a computer program to be applied to a driver assistance apparatus. The driver assistance apparatus is configured to assist driving of a vehicle. The computer program causes, when executed by one or more processors, the one or more processors to implement a method. The method includes: acquiring at least recognition area information and measurement result information from one or more environment recognizers outside the vehicle; when the one or more environment recognizers have detected a mobile body in an overlapping region between a blind spot area of the vehicle and a recognition area of the one or more environment recognizers, superimposing the recognition area information and information on the mobile body on map data, real space, or a captured image of the real space; when the one or more environment recognizers have detected no mobile body in the overlapping region, determining whether a mobile body possibly present on a second traveling road is likely to enter a merging point between a first traveling road on which the vehicle travels and the second traveling road merging into the first traveling road from an outside of the overlapping region at a time when the vehicle reaches the merging point; and refraining from superimposing the recognition area information on the map data, the real space, or the captured image of the real space when the mobile body possibly present on the second traveling road is determined to be likely to enter the merging point.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 1 is a diagram illustrating a configuration example of a driver assistance system according to one example embodiment of the disclosure.

FIG. 2 is a schematic diagram illustrating a configuration example of a vehicle to be assisted in the driver assistance system illustrated in FIG. 1.

FIG. 3 is a block diagram illustrating a configuration example of a road camera in the driver assistance system illustrated in FIG. 1.

FIG. 4 is a flowchart of an exemplary processing operation to be performed by the road camera in the driver assistance system illustrated in FIG. 1.

FIG. 5 is a block diagram illustrating a configuration example of a driver assistance apparatus in the driver assistance system illustrated in FIG. 1.

FIG. 6 is a flowchart of an exemplary driver assistance method according to one example embodiment of the disclosure.

FIG. 7 is an explanatory diagram illustrating an example case to which the driver assistance method illustrated in FIG. 6 is applicable.

FIG. 8 is a flowchart of an exemplary display process to be performed by a processing unit of the driver assistance apparatus illustrated in FIG. 5.

FIG. 9 is an explanatory diagram illustrating a display example on a display of the driver assistance apparatus illustrated in FIG. 5.

FIG. 10 is an explanatory diagram illustrating a display example on the display of the driver assistance apparatus illustrated in FIG. 5.

FIG. 11 is an explanatory diagram illustrating a display example on the display of the driver assistance apparatus illustrated in FIG. 5.

DETAILED DESCRIPTION

In a known technique of avoiding traffic accidents such as contact at intersections, a target vehicle to be assisted acquires information detected by a sensing device such as sensor or a camera of a vehicle other than the target vehicle via vehicle-to-vehicle communication or road-to-vehicle communication, and issues a notification such as a warning to a driver who drives the target vehicle.

JP-A No. 2004-114709 discloses an image display that complements a blind spot area generated by a preceding vehicle, using vehicle-to-vehicle communication. For example, the image display disclosed in JP-A No. 2004-114709 receives an image captured by a camera of the preceding vehicle via a communicator, converts the received image that is based on a setting position of the camera into an image that is based on a view-point position of a driver who drives a vehicle to be assisted. The view-point image data obtained as a result of the conversion is displayed on a windshield of the vehicle by a head-up display. The image display displays a marker on the windshield. When the driver fixes his/her eyes on the marker, a marker image formed on a cornea of the driver is detected by a camera for imaging eyeballs. When the marker image is detected, the view-point image data obtained as a result of the conversion is displayed.

JP-A No. 2008-046744 discloses a technique of detecting an approach of a mobile body present in a blind spot as seen from an own vehicle, and displaying information on the detection to a driver who drives the vehicle. For example, in the technique disclosed in JP-A No. 2008-046744, an image of a traffic condition on a road is repeatedly captured by a camera, and a mobile body moving on the road is detected based on data on the images captured by the camera. A virtual display position of the mobile body on a screen is calculated based on data on a position of the detected mobile body, and the calculated virtual display position of the mobile body is displayed on a screen in the vehicle. The virtual display position of the mobile body displayed on the screen is brought closer to an actual display position of the mobile body on the screen.

JP-A No. 2019-202589 discloses a display that reduces the sense of incongruity to a visualized image of a blind spot. For example, the display disclosed in JP-A No. 2019-202589 includes an object information obtainer, an identifier, and a display processor. The object information obtainer acquires object information on an object present in a frontal landscape. The object information indicates at least a position of the object. The identifier identifies a blind spot object that forms a blind spot to the driver, and a front object that is an element forming the blind spot, based on the object infor-mation. The display processor performs display control on a superimposed image. When the blind spot object is identified, the display processor adjusts a display position to allow display contents including an image of the blind spot object to be visually recognized at the position of the blind spot object.

However, in the technique of notifying the driver of the state of the blind spot area that is a dead angle for the driver as disclosed in each of JP-A Nos. 2004-114709, 2008-046744, and 2019-202589, the driver tends to be less aware of a risk to be caused by the blind spot area by placing too much trust in the functionality of notifying the status of the blind spot area. This can rather increase the risk. For example, in the techniques disclosed in JP-A Nos. 2004-114709, 2008-046744, and 2019-202589, information on a recognition area of a camera installed on, for example, a road or a vehicle other than the vehicle to be assisted is not shared with the vehicle to be assisted. Accordingly, when no mobile body is displayed in the blind spot area, the driver tends to continue driving the vehicle without paying his/her attention to the blind spot area even though a mobile body is likely to enter an area in a traveling direction of the vehicle from the outside of the recognition area of the camera beyond the blind spot area.

It is desirable to provide a driver assistance apparatus, a driver assistance method, and a non-transitory recording medium that each make it possible to reduce a risk of contact with a mobile body caused when a driver who drives a vehicle places too much trust in the functionality of notify-ing a state of a blind spot area.

A. Example Embodiment

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. As used herein, the term "collision" may be used interchangeably with the term "contact".

[Configuration Example of Driver Assistance System]

FIG. 1 illustrates a configuration example of a driver assistance system 1. The driver assistance system 1 may include a vehicle 10 and a road camera 100. In some embodiments, the driver assistance system 1 may include multiple vehicles 10 and multiple road cameras 100. In the following description, the vehicle 10 may correspond to a vehicle to be assisted.

The vehicle 10 may include the driver assistance appara-tus 11. The driver assistance apparatus 11 includes one or more processors. The road camera 100 may be installed on a road, for example, and include a processor 110. The processor 110 may include one or more processing units. In one embodiment, the road camera 100 may serve as an "environment recognizer". Note that the environment recognizer is not limited to the road camera 100. In some embodiments, the road camera 100 may be a sensing device, such as a light detection and ranging (LiDAR) sensor, a radar sensor, or an ultrasonic sensor, which is disposed in the vehicle 10 or another vehicle 20.

The driver assistance apparatus 11 may be configured to communicate with the road camera 100 via road-to-vehicle communication N1. In some embodiments, the driver assistance apparatus 11 may identify the road camera 100 present in a predetermined distance from a current position of the vehicle 10, and may establish mutual wireless communication with the road camera 100 thus identified. In some embodiments, the driver assistance apparatus 11 may establish mutual communication with the other vehicle 20 via vehicle-to-vehicle communication N2.

The vehicle 10 may include a sensing device. The sensing device may include, for example, one or more of a camera, a LiDAR sensor, a radar sensor, and an ultrasonic sensor. The driver assistance apparatus 11 may acquire sensor data from each sensing device in a predetermined operation cycle to execute a process of recognizing a surrounding environment of the vehicle 10. In some embodiments, the driver assistance apparatus 11 may detect an object present in a detection range of each sensing device, in the process of recognizing the surrounding environment of the vehicle 10. The term "object" as used herein may refer to various kinds of mobile bodies, static objects, and boundary lines of traveling lanes. Non-limiting examples of the mobile body may include a vehicle, a bicycle, and a pedestrian. Non-limiting examples of the static object may include a guard rail, a wall, a curb stone, a building, and a road (e.g., roads R1 and R2).

The road camera 100 may be disposed on a road or a building, for example. The processor 110 of the road camera 100 may acquire image data on the detection range in a predetermined operation cycle.

The processor 110 may transmit information on a recognition area (hereinafter referred to as recognition area information) of the road camera 100 and information on results of measurement (hereinafter referred to as measurement result information) by the road camera 100 to the driver assistance apparatus 11 in a predetermined operation cycle. The recognition area information may include, for example, data on the installation position of the road camera 100, and an angle of view, a recognition distance, and an imaging direction of the road camera 100. The term "recognition area" of the road camera 100 as used herein refers to an area in the real space in which the road camera 100 searches for the presence of an object, i.e., a detection range of the road camera 100. Accordingly, the recognition area information of the road camera 100 may include data to be used for identifying the detection range of the road camera 100 upon searching for the presence of an object in the real space.

The data on the installation position of the road camera 100 may be recorded in advance in the processor 110, as data on coordinate position indicating a latitude and a longitude of the installation position of the road camera 100, for example. The data on the angle of view and the imaging direction of the road camera 100 may be represented by a vector projected on an XY plane that is based on a coordinate system such as a world coordinate system, and the vector data may be recorded in the processor 110. In some embodiments, the data on the imaging direction of the road camera 100 may be recorded, in the processor 110, as data on an angle defined between an extending direction of a traveling road provided near the installation position of the road camera 100 and an optical axis of the road camera 100. The data on the recognition distance of the road camera 100 may be recorded in advance, in the processor 110, as the distance range in which the processor 110 is able to detect an object, based on the image data acquired by the road camera 100. Note that the term "coordinate position" as used herein refers to a two-dimensional coordinate position indicated by a latitude and a longitude, and this may similarly apply to the following description unless otherwise noted.

<Vehicle>

FIG. 2 schematically illustrates a configuration example of the vehicle 10. The vehicle 10 may be, for example, a two-wheel drive automobile or a four-wheel drive automobile that transmits driving torque to the front wheels and the rear wheels. In some embodiments, the vehicle 10 may be an electric automobile including a drive motor for the front wheels and another drive motor for the rear wheels. In some embodiments, the vehicle 10 may be an electric automobile including respective drive motors for the wheels. When the vehicle 10 is an electric automobile or a hybrid electric automobile, the vehicle 10 may include a secondary battery and a motor. The secondary battery may hold electric power to be supplied to the motor that drives the vehicle 10. The motor may output driving power of the vehicle 10. The motor may also serve as a power generator that generates electric power with which the battery is to be charged upon deceleration of the vehicle 10. The vehicle 10 may further include additional components including a power generator such as a fuel battery.

The vehicle 10 may include a driving power source 17, an electric steering device 15, braking devices 13A to 13D, and a vehicle processor 21 that are used for driving control of the vehicle 10. Hereinafter, the braking devices 13A to 13D are also simply and collectively referred to as "braking devices 13" when these braking devices are not to be distinguished from one another.

The driving power source 17 may generate driving torque and transmit the generated driving torque to a left-front wheel and a right-front wheel. The driving torque outputted from the driving power source 17 may be transmitted to a front-wheel driving shaft F via an unillustrated transmission and a differential mechanism 14. Driving of the driving power source 17 and driving of the transmission may be controlled by the vehicle processor 21. The driving power source 17 may be an internal combustion engine such as a gasoline engine or a diesel engine. In some embodiments, the driving power source 17 may be a drive motor. In some embodiments, the vehicle 10 may include both of an internal combustion engine and a drive motor as the driving power sources 17.

As illustrated in FIG. 2, the electric steering device 15 may be disposed on the front-wheel driving shaft F. The electric steering device 15 may include an unillustrated electric motor and a gear mechanism, and may adjust steering angles of the front wheels under the control by the vehicle processor 21.

Each of the braking devices 13A to 13D may apply a braking force to a corresponding one of the wheels. In some embodiments, the braking devices 13 may be hydraulic braking devices.

The vehicle processor 21 may include one or more electronic control units (ECUs). The one or more ECUs may control driving of the driving power source 17, driving of the electric steering device 15, and driving of a hydraulic unit 22. When the vehicle 10 includes a transmission that changes the output received from the driving power source 17 and transmits the changed output to the wheels, the vehicle processor 21 may control driving of the transmission.

The vehicle processor 21 may adjust hydraulic pressure to be supplied to each of the braking devices 13 by controlling driving of the hydraulic unit 22. When the vehicle 10 is an electric automobile or a hybrid electric automobile, the braking devices 13 may be used in combination with regeneration braking generated by a drive motor.

The vehicle processor 21 may be configured to acquire information transmitted from the driver assistance apparatus 11 and execute automated driving control of the vehicle 10. During manual driving, the vehicle processor 21 may control the electric steering device 15, based on a steering angle of a steering wheel 16 that varies in accordance with a driving operation performed by a driver who drives the vehicle 10. During the automated driving, the vehicle processor 21 may control the electric steering device 15, based on a set steering angle and a set steering angle speed.

The vehicle 10 may further include a sensing device 12 and a display 18. The sensing device 12 may include front imaging cameras 12A and 12B, a rear imaging camera 12C, and a vehicle position detection sensor 12D.

The front imaging cameras 12A and 12B and the rear imaging camera 12C acquires information on the surrounding environment of the vehicle 10. The front imaging cameras 12A and 12B may each capture an image of a front area ahead of the vehicle 10 in a traveling direction and generate image data. The rear imaging camera 12C may capture an image of a rear area behind the vehicle 10 in the traveling direction and generate image data. The front imaging cameras 12A and 12B, and the rear imaging camera 12C may each include an imaging device such as a charged coupled device (CCD) or a complementary metal oxide semiconductor (CMOS) and transmit the generated image data to the driver assistance apparatus 11. In the vehicle 10 illustrated in FIG. 2, the front imaging cameras 12A and 12B may serve as right and left cameras paired into a stereo camera; however, the front imaging cameras 12A and 12B are not limited thereto. In some embodiments, the front imaging cameras 12A and 12B may be monocular cameras.

In some embodiments, the sensing device 12 may include unillustrated cameras disposed on respective side mirrors of the vehicle 10, in addition to the front imaging cameras 12A and 12B and the rear imaging camera 12C. The cameras disposed on the respective side mirrors may capture images of a left-rear areas and a right-rear areas of the vehicle 10, for example. Alternatively, or in addition thereto, the sensing device 12 may include one or more of a LiDAR sensor, a millimeter-wave radar, and an ultrasonic sensor. In some embodiments, the sensing device 12 may include a vehicle speed sensor that detects a moving speed of the vehicle 10.

The vehicle position detection sensor 12D may receive satellite signals from positioning satellites of a global navigation satellite system (GNSS) such as the global positioning system (GPS) or any other system having positioning functionality. The vehicle position detection sensor 12D may detect a current position of the vehicle 10 in a predetermined operation cycle, based on the received satellite signals, and may transmit data indicating the detected current position of the vehicle 10 (hereinafter referred to as position data) to the driver assistance apparatus 11. The position data may be represented as a coordinate position indicated by a latitude and a longitude, for example. In some embodiments, the vehicle position detection sensor 19 may include an antenna that receives satellite signals from a satellite system, other than the GPS, which identifies the coordinate position of the vehicle 10, in addition to or in place of the GPS sensor.

In some embodiments, the driver assistance apparatus 11 may generate data indicating a moving direction of the vehicle 10 (hereinafter referred to as moving direction data) and data indicating a moving speed of the vehicle 10 (hereinafter referred to as moving speed data), based on the position data received from the vehicle position detection sensor 12D. The driver assistance apparatus 11 may calculate the moving speed of the vehicle 10, based on, for example, a change in coordinate position of the vehicle 10. In one example, the driver assistance apparatus 11 may calculate the moving speed of the vehicle 10 by dividing a distance from the coordinate position of the vehicle 10 obtained in a previous operation cycle to the coordinate position of the vehicle 10 obtained in a current operation cycle by a unit time corresponding to the operation cycle. In some embodiments, the driver assistance apparatus 11 may calculate the moving direction of the vehicle 10 as a direction in which the coordinate position of the vehicle 10 is to change.

The display 18 may be driven by the driver assistance apparatus 11 to display various kinds of information visually recognizable by the driver. The display 18 according to the example embodiment may be an augmented reality (AR) display or a head-up display that AR-displays information visually recognizable by the driver on, for example, a windshield 181 of the vehicle 10 by superimposing the information on the real space around the vehicle 10; however, the display 18 is not limited thereto. In some embodiments, the display 18 may be disposed in an instrument panel. In some embodiments, the display 18 may be a display of a navigation system.

<Road Camera>

Next, descriptions will be given of a configuration example and an exemplary operation of the road camera 100.

Configuration Example of Road Camera

FIG. 3 is a block diagram illustrating a configuration example of the road camera 100. The processor 110 may include a communicator 111, a processing unit 112, and a storage 113. The communicator 111 may be an interface that communicates with the vehicle 10 via the road-to-vehicle communication N1. The processing unit 112 may include one or more central processing units (CPUs) such as graphics processing units (GPUs). The processing unit 112 may execute a computer program stored in the storage 113 to thereby transmit the measurement result information indicating the results of measurement that has been made based on image data transmitted from an image generator 120 to the vehicle 10 in a predetermined operation cycle.

The storage 113 may include one or more memories, and may hold computer programs to be executed by the processing unit 112, various parameters to be used for calculation processing, and data on results of the calculation processing. A part of the storage 113 may be used as a work area of the processing unit 112.

Non-limiting examples of the storage 113 may include: a magnetic medium such as a hard disk, a floppy disk, or a magnetic tape; an optical recording medium such as a compact disk read-only memory (CD-ROM), a digital versatile disk (DVD), or a Blu-ray (registered trademark); a magneto-optical medium such as a floptical disk; a memory such as a random access memory (RAM) or a read-only memory (ROM); a flash memory such as a universal serial bus (USB) memory or a solid state drive (SSD) memory; or another recording medium. The storage 113 may hold the recognition area information and the measurement result information.

The processing unit 112 may include an image processor 112A and a communication processor 112B. The functionality of these processors may be implemented when the processing unit 112 executes the computer programs. The image processor 112A may execute a surrounding environment recognition process, based on the image data transmitted from the image generator 120 in the predetermined operation cycle. The image processor 112A may detect an object present in the detection range of the road camera 100 in the surrounding environment recognition process. The term "object" as used herein may refer to various kinds of mobile bodies, static objects, and boundary lines of traveling lanes. Non-limiting examples of the mobile body may include a vehicle, a bicycle, and a pedestrian. Non-limiting examples of the static object may include a guard rail, a wall, a curb stone, a building, and a road (e.g., the road R2 that will be described later). In some embodiments, the image processor 112A may execute a process of calculating a moving speed and a moving direction of the mobile body, based on a change in coordinate position of the recognized mobile body.

The communication processor 112B may transmit the measurement result information to the vehicle 10 in a predetermined operation cycle. The measurement result information may include information on the kind and coordinate position of the object recognized by the image processor 112A in the surrounding environment recognition process. When the object recognized by the image processor 112A is a mobile body, the measurement result information may include information on the recognized mobile body (hereinafter referred to as mobile body information). The mobile body information may include data on the coordinate position of the mobile body recognized by the road camera 100 and data on a moving speed and a moving direction of the mobile body. The communication processor 112B may transmit the recognition area information and the measurement result information to the vehicle 10.

Exemplary Operation of Road Camera

FIG. 4 is a flowchart illustrating an exemplary processing operation of the road camera 100. The flowchart illustrated in FIG. 4 may be repeatedly executed in a predetermined operation cycle.

When receiving a transmission request for aquisition of the recognition area information and the measurement result information from the vehicle 10 (Step S11: YES), the image processor 112A of the processing unit 112 may acquire the image data from the image generator 120 (Step S12).

Thereafter, the image processor 112A may execute the surrounding environment recognition process, based on the acquired image data (Step S13). In some embodiments, the image processor 112A may perform an edge detection process to extract feature points from the image data (captured image), perform a process of matching (pattern matching) the extracted feature points with feature points of various objects preliminarily stored, and perform a process of recognizing an object present within the detection range of the road camera 100. The object to be recognized may be a mobile body such as another vehicle, a pedestrian, or a bicycle, or a static object such as a road.

The image processor 112A may calculate the moving speed and the moving direction of the recognized mobile body in the real space. In some embodiments, the image processor 112A may calculate the moving speed and the moving direction of the moving body in the real space, based on a temporal change in coordinate position of the mobile body in the captured image acquired in the predetermined operation cycle. Note that the method of calculating the moving speed and the moving direction of the recognized mobile body may be performed based on an existing technique, and is not limited to a particular method.

Thereafter, the communication processor 112B may transmit the measurement result information regarding the object recognized by the image processor 112A in the surrounding environment recognition process and the recognition area information, to the vehicle 10 (Step S14). The processor 110 may repeatedly execute the above-described steps (Steps S11 to S14) in a predetermined operation cycle.

<Driver Assistance Apparatus>

Next, a description will be given of a configuration example of the driver assistance apparatus 11.

Configuration Example of Driver Assistance Apparatus

The driver assistance apparatus 11 assists the driver in driving the vehicle 10 when a computer program is executed by one or more processors such as CPUs. The computer program causes the one or more processors to implement processing such as a driver assistance method according to an example embodiment of the disclosure. In some embodiments, the computer program to be executed by the one or more processors may be recorded in a recording medium serving as a memory 104 provided in the driver assistance apparatus 11. In some embodiments, the computer program may be recorded in a recording medium incorporated in the driver assistance apparatus 11. In some embodiments, the computer program may be recorded in any recording medium externally attachable to the driver assistance apparatus 11.

Non-limiting examples of the recording medium holding the computer program may include: a magnetic medium such as a hard disk, a floppy disk, or a magnetic tape; an optical recording medium such as a CD-ROM, a DVD, or a Blu-ray (registered trademark); a magneto-optical medium such as a floptical disk; a memory such as a RAM or a ROM; a flash memory such as a USB memory or an SSD; and another medium configured to hold programs.

FIG. 5 is a block diagram illustrating a configuration example of the driver assistance apparatus 11 according to the example embodiment. The sensing device 12 (i.e., the front imaging cameras 12A and 12B, the rear imaging camera 12C, and the vehicle position detection sensor 12D), the vehicle processor 21, and the display 18 may be coupled to the driver assistance apparatus 11 via a dedicated line or a communication network such as a controller area network (CAN) or a local interconnect network (LIN). Note that the driver assistance apparatus 11 is not limited to an ECU mounted in the vehicle 10. In some embodiments, the driver assistance apparatus 11 may be a terminal device such as a touch pad or a wearable device.

The driver assistance apparatus 11 may include a road-to-vehicle communicator 101, a vehicle-to-vehicle communicator 102, a processing unit 103, and the memory 104. The processing unit 103 may include oner or more processors such as CPUs and various peripheral components. In some embodiments, all or a part of the processing unit 103 may be updatable software such as firmware or a program module to be executed in response to a command from the CPUs.

a. Road-to-Vehicle Communicator

The road-to-vehicle communicator 101 may be an interface that communicates with the road camera 100 present within a predetermined distance from the vehicle 10. The driver assistance apparatus 11 may send and receive information to/from the road camera 100 via the road-to-vehicle communicator 101.

b. Vehicle-to-Vehicle Communicator

The vehicle-to-vehicle communicator 102 may be an interface that communicates with the other vehicle 20 present within a predetermined distance from the vehicle 10. The driver assistance apparatus 11 may send and receive information to/from the other vehicle 20 via the vehicle-to-vehicle communicator 102.

c. Memory

The memory 104 may be a recording medium communicably coupled to the processing unit 103 and include one or more RAMs, ROMs, HDDs, CDs, DVDs, SSDs, USB flashes, or other storage devices. Note that the memory 104 is not particularly limited in kind or number. The memory 104 may hold computer programs to be executed by the processing unit 103, various parameters to be used for calculation processing, detection information, and information on results of the calculation processing. A part of the memory 104 may be used as a work area of the processing unit 103.

The memory 104 according to the example embodiment may hold data on the detection range of the sensing device 12. In some embodiments, the memory 104 may hold data on the detection ranges of the front imaging cameras 12A and 12B and the rear imaging camera 12C. The data may include, for example, data on an angle (inclination) defined between the traveling direction of the vehicle 10 and a center axis of the detection range, data on an angle from the center axis of the detection range, and data on a distance of the detection range in a direction along the center axis.

d. Processing Unit

The processing unit 103 may include a road-to-vehicle communication processor 103A, a vehicle-to-vehicle communication processor 103B, a surrounding environment recognition processor 103C, and a display processor 103D. The functionality of these processors may be implemented when the processing unit 103 executes the computer programs. Note that a part of the road-to-vehicle communication processor 103A, the vehicle-to-vehicle communication processor 103B, the surrounding environment recognition processor 103C, and the display processor 103D may be hardware such as analog circuitry.

The road-to-vehicle communication processor 103A may communicate with the road camera 100 present within a predetermined distance from the vehicle 10 in a predetermined operation cycle to thereby acquire the recognition area information and the measurement result information from the road camera 100.

The vehicle-to-vehicle communication processor 103B may communicate with the other vehicle 20 present within a predetermined distance from the vehicle 10 in a predetermined operation cycle, to thereby transmit the position data on the vehicle 10, the data on the detection range of the sensing device 12, and the data on results of detection by the sensing device 12 mounted in the vehicle 10 to the other vehicle 20. The data on the results of detection by the sensing device 12 may include data obtained in the surrounding environment recognition process performed by the surrounding environment recognition processor 103C.

The vehicle-to-vehicle communication processor 103B may communicate with the other vehicle 20 present within a predetermined distance form the vehicle 10, to thereby acquire data on a coordinate position of the other vehicle 20, data on a detection range of an unillustrated sensing device mounted in the other vehicle 20, and data on results of detection performed by the unillustrated sensing device.

The surrounding environment recognition processor 103C may execute the surrounding environment recognition process, based on sensor data acquired from the sensing device 12 mounted in the vehicle 10. The surrounding environment recognition processor 103C may detect a mobile body and a static object present around the vehicle 10 in the surrounding environment recognition process. The process to be performed by the surrounding environment recognition processor 103C will be described in detail later.

The display processor 103D may cause the display 18 to superimpose the recognition area information obtained by the road camera 100 or both of the recognition area information obtained by the road camera 100 and the mobile body information on the mobile body recognized by the road camera 100, on the real space, as information visually recognizable by the driver of the vehicle 10.

[Driver Assistance Method]

FIG. 6 is a flowchart of an exemplary driver assistance method according to the example embodiment of the disclosure. FIG. 7 is an explanatory diagram illustrating an example case to which the driver assistance method is applicable. In the example case illustrated in FIG. 7, there is an intersection X between a road R1 on which the vehicle 10 travels and the road R2 located in front of the vehicle 10 in the traveling direction, and there is a side wall W on a left side of the road R1 as seen from the vehicle 10. The side wall W blocks a field of view (measurement range) of the sensing device 12 of the vehicle 10 and a field of view of the driver who drives the vehicle 10. In such as situation, the side wall W hinders the driver of the vehicle 10 from recognizing an area that the vehicle 10 is to enter after turning left at the intersection X. In the following, an exemplary driver assistance method according to the example embodiment of the disclosure is described with reference to FIGS. 6 and 7, as appropriate. Note that the flowchart illustrated in FIG. 6 may be repeatedly executed in a predetermined operation cycle in a state where the functionality according to the example embodiment of the disclosure is activated. The intersection X may be a non-limiting example of a merging point.

When the processing unit 103 of the driver assistance apparatus 11 detects the activation of assistance functionality (Step S21), the surrounding environment recognition processor 103C may acquire the sensor data from the sensing device 12 (Step S22).

Thereafter, the surrounding environment recognition processor 103C may execute the surrounding environment recognition process, based on the sensor data received from the sensing device 12 (Step S23). In some embodiments, the surrounding environment recognition processor 103C may recognize an object present around the vehicle 10, using a technique of detecting edges from the image data generated by the front imaging cameras 12A and 12B and the rear imaging camera 12C.

Thereafter, the surrounding environment recognition processor 103C may determine whether a blind spot is present, based on the results of the surrounding environment recognition process (Step S24). When a three-dimensional object (e.g., the side wall W) having a predetermined size or larger is detected in the surrounding environment recognition process, for example, the surrounding environment recognition processor 103C may recognize an area located beyond the three-dimensional object as seen from the vehicle 10 as a blind spot area D, and may determine that the blind spot is present. The method of determining whether the blind spot area D is present in Step S24 is not limited to a particular method, and may be based on an existing technique disclosed in, for example, JP-A No. 2008-041058.

If determining that the blind spot is not present (Step S24: NO), the surrounding environment recognition processor 103C may repeatedly execute Steps S21and S22 described above in a predetermined operation cycle until a blind spot is detected.

In contrast, if the surrounding environment recognition processor 103C determines that the blind spot is present (Step S24: YES), the road-to-vehicle communication processor 103A may determine whether the vehicle 10 is communicating with the road camera 100 (Step S25). If the road-to-vehicle communication processor 103A determines that the vehicle 10 is not communicating with the road camera 100 (Step S25: NO), the display processor 103D may notify the driver who drives the vehicle 10 of the presence of the blind spot area D by causing, for example, the display 18 to display the notification (Step S26). In some embodiments, the display processor 103D may notify the driver who drives the vehicle 10 of the presence of the blind spot area D by causing the display 18 to display information indicating a position of the detected blind spot area D and information for identifying a three-dimensional object forming the blind spot area D. In some embodiments, the display processor 103D may notify the driver of the presence of the blind spot area D by means of sounds.

If determining that the vehicle 10 is communicating with the road camera 100 (Step S25: YES), the road-to-vehicle communication processor 103A may transmit the transmission request for acquisition of the recognition area information and the measurement result information to the road camera 100. Thereafter, the surrounding environment recognition processor 103C may acquire the recognition area information and the measurement result information from the road camera 100 having received the transmission request (Step S27).

Thereafter, the surrounding environment recognition processor 103C may identify an overlapping region Z, which is a shaded area in FIG. 7, where the detection range (a recognition area E) of the road camera 100 communicating with the vehicle 10 and the blind spot area D overlap each other, based on the recognition area information thus acquired and the information indicating the blind spot area D thus detected (Step S28). In some embodiments, the surrounding environment recognition processor 103C may identify an area in which a mobile body such as a pedestrian or another vehicle is possibly present, based on the results of recognition of the surrounding environment of the vehicle 10 by the road camera 100 or by the sensing device 12 disposed in the vehicle 10, and may limit the overlapping region Z to the area in which the mobile body is possibly present. The area in which the mobile body is possibly present of the overlapping region Z may be identified based on a current position of the vehicle 10 and a road shape recorded in map data.

Thereafter, the display processor 103D may execute a display process, in accordance with the determination as to whether a mobile body is present in the overlapping region Z thus identified (Step S29). In the following, the display process at Step S29 is described with reference to FIG. 8, as appropriate.

FIG. 8 is a flowchart of an exemplary display process to be performed by the processing unit 103. The display processor 103D may determine whether a mobile body is present in the overlapping region Z, based on the measurement result information acquired in Step S27 described above and the information indicating the overlapping region Z identified by the surrounding environment recognition processor 103C (Step S291). In some embodiments, the display processor 103D may determine whether the mobile body having been recognized in the recognition area E of the road camera 100 in the surrounding environment recognition process (Step S13) performed by the road camera 100 communicating with the vehicle 10 is present within the overlapping region Z thus identified.

If determining that the mobile body is present within the overlapping region Z (Step S291: YES), the display processor 103D may cause the display 18 to superimpose, on the windshield 181, the mobile body information on the mobile body present within the overlapping region Z and the recognition area information acquired from the road camera 100 communicating with the vehicle 10 (Step S293).

FIG. 9 is an explanatory diagram illustrating an example of the superimposing display to be performed when the mobile body is determined to be present within the overlapping region Z in the situation illustrated in FIG. 7. In the example illustrated in FIG. 9, information on a part of the overlapping region Z recognized by the road camera 100 and information on an outline of a mobile body O recognized by the road camera 100 are AR-displayed as the recognition area information and the mobile body information, respectively, on a windshield 181 so as to be superimposed on the real space around the vehicle 10. The recognition area information to be displayed may include at least information on an outermost edge of the detection range defined with reference to the road camera 100 set as a base point. Note that the term "outermost edge of the detection range" may refer to one boundary that is most distant from the road camera 100 set as the base point, out of the boundaries defining the overlapping region Z. In other words, the outermost edge of the detection range may correspond to a limit location of the detection range that is most distant from the road camera 100.

Such AR-display of the recognition area information and the mobile body information on the windshield 181 as illustrated in FIG. 9 allows the detection range of the road camera 100 at the time of recognition of the mobile body O to be explicitly presented to the driver who drives the vehicle 10. Accordingly, it is possible for the driver who drives the vehicle 10 to clearly know how much area of the blind spot area D the road camera 100 has searched for the mobile body O until the recognition of the mobile body O. This urges the driver who drives the vehicle 10 to be aware of a risk to be caused by the mobile body O that is likely to enter the area ahead of the vehicle 10 in the traveling direction. Accordingly, even if the mobile body O suddenly runs out into the area ahead of the vehicle 10 in the traveling direction, for example, the driver is able to easily take action to avoid the mobile body O.

In the example illustrated in FIG. 9, the road camera 100 may recognize the region of the blind spot area D including the road R2 on which the mobile body O such as a pedestrian is possibly present, and the outer edge of the recognized region (the outer edge of the detection range of the road camera 100) may be AR-displayed. Accordingly, when the mobile body O is recognized within the blind spot area D by the road camera 100, the driver who drives the vehicle 10 is able to clearly know how much area of the blind spot area D the road camera 100 has searched for the mobile body O.

In contrast, if determining that no mobile body is present within the overlapping region Z (Step S291: NO), the display processor 103D may compare a predetermined multiplication value TV with a distance L to determine whether the multiplication value TV is greater than or equal to the distance L (Step S292). Here, the multiplication value TV may be obtained by multiplying a necessary time T to be taken by the vehicle 10 to reach the intersection X by a predetermined moving speed V. In other words, the multiplication value TV indicates an estimated distance in which the mobile body possibly present on the road R2 is to move until a time $t_2$ when the vehicle 10 reaches the intersection X. The distance L may refer to a distance between the outermost edge of the overlapping region Z (indicated by a thick solid line in FIG. 7) and the intersection X with reference to the road camera 100 set as the base point.

That is, in Step S292, the display processor 103D may determine, through calculation, whether the mobile body possibly present on the road R2 is movable in the distance L or longer by the time $t_2$ when the vehicle 10 reaches the intersection X. The determination process at Step S292 may correspond to a process of determining whether a mobile body is likely to enter the intersection X from the outside of the overlapping region Z at the time $t_2$ when the vehicle 10 reaches the intersection X. If the multiplication value TV is greater than or equal to the distance L, it may be determined that a mobile body having not been detected by the road camera 100 at a current time $t_1$ is likely to enter the intersection X simultaneously with the vehicle 10 at the time $t_2$ when the vehicle 10 reaches the intersection X (TV=L).

In the calculation processing described below, the intersection X may be used as data on a position (a point P in FIG. 7) at which a center line of the lane of the road R1 on which the vehicle 10 travels intersects a center line of the road R2, for example. Note that the position of the intersection X to be used for the calculation processing may be determined according to any criterion.

The processing unit 103 may calculate the necessary time T to be taken by the vehicle 10 to travel from the current position to the intersection X, based on the distance L1 from the current position of the vehicle 10 to the intersection X (i.e., the point P) and a current vehicle speed of the vehicle 10, for example. The distance L1 may be calculated from the results of detection by the sensing device 12. In some embodiments, the processing unit 103 may calculate a distance between the coordinated position of the intersection X (i.e., the point P) recorded in the map data and the current position of the vehicle 10, as the distance L1. The current vehicle speed of the vehicle 10 may be calculated from the speed of change in the position data on the vehicle 10 detected by the vehicle position detection sensor 12D, or may be calculated from the data on a vehicle speed detected by the vehicle speed sensor. The term "current position" described above may refer to the coordinate position of the vehicle 10 at the current time $t_1$.

The predetermined moving speed V may be a speed of the mobile body possibly present on the road R2. The predetermined moving speed V may be set to any value, based on the kind of the mobile body, a speed limit on the road R2, a width of the road R2, and the kind of the road R2 (a residential road, a shopping mall road, or a two-lane road having one lane on each side), for example. When it is assumed that the mobile body is an automobile, the predetermined moving speed V may be set to the speed limit on the road R2. In some embodiments, data on the speed limit may be recorded in the map data. In some embodiments, the data on the speed limit may be acquired from an external information provision system. In some embodiments, the moving speed V may be appropriately adjusted in accordance with the width and kind of the road R2, based on the speed limit set as a reference speed. When it is assumed that the mobile body is a bicycle, the predetermined moving speed V may be set to an value of, for example, 2.8 m/s (10 km/h).

The distance L may be calculated as the distance between the coordinate position of the intersection X (the point P) and a coordinate position of the outermost edge (indicated by the thick solid line in FIG. 7) of the overlapping region Z on the road R2 defined with reference to the road camera 100 set as the base point. The coordinate position of the outermost edge of the overlapping region Z may be identified from the recognition area information acquired from the road camera 100.

When the multiplication value TV obtained by multiplying the calculated necessary time T by the predetermined moving speed V is greater than or equal to the distance L (Step S292: YES), the display processor 103D determines that a mobile body having not been recognized on the road R2 at the current time $t_1$ is likely to enter the intersection X from the outside of the overlapping region Z at the time $t_2$ when the vehicle 10 reaches the intersection X, and refrain from causing the display 18 to display the recognition area information and the measurement result information regarding at least the overlapping region Z (Step S294).

In an example where the necessary time T is 10 seconds, the distance L is 50 meters, and the speed limit for vehicles on the road R2 (the predetermined moving speed V) is 8.3 m/s (30 km/h), the multiplication value TV is calculated as 83 meters (8.3 m/s× 10 seconds), which is greater than the distance L. In this case, the display processor 103D may determine that an automobile traveling on the road R2 is likely to enter the intersection X from the outside of the overlapping region Z at the time $t_2$ when the vehicle 10 reaches the intersection X even when no mobile body has been recognized in the overlapping region Z at the current time $t_1$, and may refrain from causing the display 18 to display the recognition area information and the measurement result information.

FIG. 10 is an explanatory diagram illustrating a display example (non-display) to be displayed on the windshield 181 when it is determined that no mobile body is present in the overlapping region Z. In the example illustrated in FIG. 10, the recognition area information may not be AR-displayed on the windshield 181. In such a case where no mobile body is present in the overlapping region Z, the measurement result information regarding at least the overlapping region Z may not be displayed either. Accordingly, it is necessary for the driver to drive the vehicle 10 in accordance with his/her own judgement. This helps to prevent the driver from placing too much trust in the functionality of notifying the state of the blind spot. It is therefore possible to reduce the risk of contact between the vehicle and the mobile body caused when the driver who drives the vehicle 10 places too much trust in the functionality.

If the multiplication value TV is less than the distance L (Step S292: NO), the display processor 103D determines that a mobile body traveling on the road R2 is unlikely to enter the intersection X from the outside the overlapping region Z at a time $t_2$ when the the vehicle 10 reaches the intersection X, and causes the display 18 to superimpose the recognition area information and the measurement result information on the windshield 181 (Step S293).

In an example where the necessary time T is 10 seconds, the distance L is 100 meters, and the speed limit on the road R2 (the predetermined moving speed V) is 8.3 m/s (30 km/h), the multiplication value TV is calculated as 83 meters (8.3 m/s×10 seconds), which is less than the distance L. In this case, the display processor 103D may estimate that a maximum moving distance of the mobile body on the road R2 from the outside of the overlapping region Z to the intersection X is 83 meters, which is less than the distance L of 100 meters, and may determine that the mobile body is unlikely to enter the intersection X from the outside of the overlapping region Z at the time $t_2$ when the vehicle 10 reaches the intersection X. The display processor 103D may thus cause the display 18 to superimpose the recognition area information and the measurement result information on the windshield 181. In this case, no mobile body may be recognized in the overlapping region Z by the road camera 100; therefore, the mobile body information on a mobile body present in the overlapping region Z may not be displayed.

FIG. 11 is an explanatory diagram illustrating a display example (superimposing display) to be displayed on the windshield 181 when it is determined that no mobile body is present in the overlapping region Z. In the example illustrated in FIG. 11, the outer edge of the detection range of the road camera 100 in the overlapping region Z may be AR-displayed as the recognition area information on the windshield 181. In this case, no mobile body may be recognized in the overlapping region Z by the road camera 100; therefore, the mobile body information on a mobile body present in the overlapping region Z may not be displayed. This allows the detection range of the road camera 100 to be explicitly presented to the driver who drives the vehicle 10. Accordingly, the driver of the vehicle 10 is able to clearly know that no mobile body is present within the detection range. It is therefore possible for the driver to drive the vehicle 10 to pass through the intersection X by placing trust in the functionality of driver assistance. This reduces psychological burden on the driver.

As described above, the processing unit 103 according to the present example embodiment determines whether the mobile body possibly present on the road R2 is likely to enter the intersection X from the outside of the overlapping region Z at the time $t_2$ when the vehicle 10 reaches the intersection X, based on the multiplication value TV obtained by multiplying the necessary time T to be taken by the vehicle 10 to reach the intersection X by the predetermined moving speed V, and the distance L between the outermost edge of the overlapping region Z and the intersection X defined with reference to the road camera 100 set as the base point. According to the present example embodiment, the processing unit 103 makes it possible to determine whether the mobile body possibly present on the road R2 is able to reach the intersection X at the time $t_2$ when the vehicle 10 reaches the intersection X, based on the moving speed of the mobile body. This enhances accuracy in determining whether a mobile body that is a possible danger to the vehicle 10 is present.

B. Modification Example

Although some example embodiments of the disclosure have been described so far, the disclosure is not limited to the example embodiments described above, and various modification may be made to the disclosure. In the following, some modification examples applicable to the example embodiments described above will be described. The example embodiments described above may be appropriately modified into any one or more modification examples described below to the extent that no contradiction occurs.

In the example embodiments described above, the outer edge of the detection range of the overlapping region Z on the road R2 on which the mobile body is possibly present may be AR-displayed when the display processor 103D causes the recognition area information to be superimposed; however, the recognition area information to be displayed is not limited to the example described above. In some embodiments, the display processor 103D may cause the entire overlapping region Z to be displayed together with the outer edge of the detection range of the road camera 100. In some embodiments, the display processor 103D may cause an outer edge of the entire detection range (the recognition area E) of the road camera 100 to be displayed in place of the overlapping region Z. Even when the recognition area information is displayed in such a manner, effects similar to those in the example embodiments described above are obtainable.

In the example embodiments described above, the vehicle 10 and the road camera 100 may be coupled to each other via the road-to-vehicle communication N1; however, this is a non-limiting example. In some embodiments, the vehicle 10 and the road camera 100 may be communicably and mutually coupled to an information processor such as a cloud server. In this case, the processor 110 of the road camera 100 may transmit the recognition area information and the measurement result information to the information processor. In some embodiments, the processor 110 may transmit the recognition area information and the measurement result information to the information processor after receiving a transmission request from the information processor. Further, when the information processor is provided with a database holding information on the respective recognition areas of multiple road cameras 100, the road camera 100 may simply transmit identification data for identifying each of the road cameras 100 to the information processor.

In the example embodiments described above, the surrounding environment recognition process (Step S13) may be performed by the processor 110 of the road camera 100; however, this is a non-limiting example. In some embodiments, the surrounding environment recognition process may be performed by the driver assistance apparatus 11 of the vehicle 10. In some embodiments, the surrounding environment recognition process may be performed by the information processor such as a cloud server.

In the example embodiments described above, the surrounding environment recognition process (Step S23) may be performed by the processing unit 103 of the vehicle 10; however, this is a non-limiting example. In some embodiments, the surrounding environment recognition process may be performed by the processor 110 of the road camera 100. In some embodiments, the surrounding environment recognition process may be performed by the information processor such as a cloud server.

In the example embodiments described above, the overlapping region Z may be a region where the recognition area E of the road camera 100 and the blind spot area D overlap each other; however, this is a non-limiting example. In some embodiments, the overlapping region Z may be a region where the detection range of a sensing device mounted in the other vehicle 20 and the blind spot area D overlap each other. In other words, the driver assistance process described above may be executed using the sensing device mounted in the other vehicle 20 as the surrounding environment recognizer. In this case, the detection range may correspond to an example of the "recognition area".

In the example embodiments described above, the moving speed data on the vehicle 10 may be generated based on the position data detected by the vehicle position detection sensor 12D; however, this is a non-limiting example. In some embodiments, the moving speed data on the vehicle 10 may be generated based on sensor data acquired by the vehicle speed sensor or a wheel speed sensor.

In the example embodiments described above, the blind spot area D may be detected based on the feature points extracted from the image data generated by the front imaging cameras 12A and 12B and the rear imaging camera 12C in Step S23; however, this is a non-limiting example. In some embodiments, the blind spot area D may be detected based on extracted point group data related to an object detected around the vehicle 10 by a LiDAR sensor.

In the example embodiments described above, the recognition area information and the mobile body information may be superimposed (AR-displayed) on the real space; however, this is a non-limiting example. In some embodiments, the recognition area information and the mobile body information may be superimposed on the map data. In some embodiments, the recognition area information and the mobile body information may be superimposed on captured image data on the real space. The term "map data" as used herein encompasses data to be displayed, such as data on coordinate positions of obstacles, data on lanes, data on buildings, and other kinds of data.

C. Supplementary Explanation

The driver assistance apparatus and the driver assistance method described in the foregoing example embodiments may be applicable to an automobile; however, the driver assistance apparatus and the driver assistance method according to the example embodiments of the disclosure may be applied to a mobile body other than an automobile, and an application of the example embodiments of the disclosure is not limited to a particular application.

The effects described herein are merely illustrative and non-limiting examples. That is, the disclosure may provide any other effects that are apparent for persons skilled in the art in the scope of the description herein, in addition to or in place of the effects described above.

Although some example embodiments of the disclosure have been described in the foregoing by way of example with reference to the accompanying drawings, the disclosure is by no means limited to the example embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In some embodiments, a part of the functionalityof the driver assistance apparatus and the road camera described in the foregoing example embodiments may be implemented by any other devices.

In the foregoing example embodiments, the driver assistance apparatus may be an ECU mounted in the vehicle; however, the technology according to an embodiment of the disclosure is not limited to the example. In some embodiments, the driver assistance apparatus may be a portable device configured to communicate with a device different from a vehicle and transmit a driving command to any display. Non-limiting examples of the portable device may include a lap-top computer, a portable phone, a smartphone, and a tablet device.

In the foregoing example embodiments, the term "coordinate position" may refer to a two-dimensional coordinate position indicated by a latitude and a longitude; however, this is a non-limiting example. In some embodiments, the coordinate position may be a three-dimensional coordinate position indicated by a latitude, a longitude, and a height in the real space.

Further, the technology according to any embodiment of the disclosure may be implemented as a vehicle equipped with the driver assistance apparatus described in the foregoing example embodiment, a driver assistance method performed by the driver assistance apparatus, a computer program that causes a computer to serve as the driver assistance apparatus, and a non-transitory recording medium containing the computer program.

D. Supplementary Note

The following aspects are obtainable from the example embodiments described above.

One aspect of the disclosure provides a driver assistane apapratus configured to assist driving of a vehicle. The driver assistance apparatus includes one or more processors and one or more memories communicably coupled to the one or more processors. The one or more processors are configured to: acquire at least recognition area information and measurement result information from one or more environment recognizers outside the vehicle; and superimpose, when the one or more environment recognizers have detected a mobile body in an overlapping region between a blind spot area of the vehicle and a recognition area of the one or more environment recognizers, the recognition area information and information on the mobile body on map data, real space, or a captured image of the real space. According to the aspect, it is possible for a driver who drives the vehicle to clearly know how much area of the blind spot area the one or more environment recognizers have searched for the mobile body until the recognition of the mobile body in the blind spot area by the one or more environment recognizers. This urges the driver to be aware of a risk to be caused by the mobile body. Accordingly, even if the mobile body suddenly runs out into an area ahead of the vehicle in the traveling direction, for example, the driver is able to easily take action to avoid the mobile body.

According to one aspect of the disclosure, when the one or more environment recognizers have detected no mobile body in the overlapping region, the one or more processors determines whether a mobile body possibly present on the second traveling road is likely to enter a merging point between a first traveling road on which the vehicle travels and the second traveling road merging into the first traveling road from the outside of the overlapping region at the time when the vehicle reaches the merging point. When determining that the mobile body possibly present on the second traveling road is likely to enter the merging point, the one or more processors may refrain from superimposing the recognition area information on the map data, the real space, or the captured image of the real space. According to the aspect, it is necessary for the driver to drive the vehicle in accordance with his/her own judgement. This helps to prevent the driver from placing too much trust in the functionality of notifying the state of the blind spot. Accordingly, it is possible to reduce the risk of contact between the vehicle and the mobile body caused when the driver who drives the vehicle places too much trust in the functionality.

According to one aspect of the disclosure, when the one or more environment recognizers have detected no mobile body in the overlapping region, the one or more processors are configured to determine whether the mobile body possibly present on the second traveling road is likely to enter the merging point from the outside of the overlapping region at the time when the vehicle reaches the merging point. When determining that the mobile body possibly present on the second traveling road is unlikely to enter the merging point, the one or more processors may superimpose the recognition area information on the map data, the real space, or the captured image of the real space. According to the aspect, the detection range of the one or more environment recognizers is explicitly presented to the driver who drives the vehicle. This allows the driver who drives the vehicle to clearly recognize the absence of a mobile body in the detection range. It is therefore possible for the driver to drive the vehicle to pass through the merging point by placing trust in the driver assistance functionality. This reduces a physical burden on the driver.

According to one aspect of the disclosure, the one or more processors are configured to determine whether the mobile body possibly present on the second traveling road is likely to enter the merging point from the outside of the overlapping region at the time when the vehicle reaches the merging point, based on: a multiplication value obtained by multiplying a time necessary for the vehicle to reach the merging point by a predetermined moving speed; and a distance between the merging point and an outermost edge of the overlapping region defined with reference to the one or more environment recognizers set as a base point. According to the aspect, the driver assistance apparatus makes it possible to determine whether the mobile body possibly present on the second traveling road is likely to reach the merging point at the time when the vehicle reaches the merging point, based on the moving speed of the mobile body. This enhances accuracy in determining whether a mobile body that is a possible danger to the vehicle is present.

One aspect of the disclosure provides a driver assistance method of assisting driving of a vehicle. The driver assistance method includes: acquiring at least recognition area information and measurement result information from one or more environment recognizers outside the vehicle; and superimposing, when the one or more environment recognizers have detected a mobile body in an overlapping region between a blind spot area of the vehicle and a recognition area of the one or more environment recognizers, the recognition area information and information on the mobile body on map data, real space, or a captured image of the real space. According to the aspect, it is possible for a driver who drives the vehicle to clearly know how much area of the blind spot area the one or more environment recognizers have searched for the mobile body until the recognition of the mobile body in the blind spot area by the one or more environment recognizers. This urges the driver who drives the vehicle to be aware of a risk to be caused by the mobile body. Accordingly, even if the mobile body suddenly runs out into the area ahead of the vehicle in the traveling direction, for example, the driver is able to easily take action to avoid the mobile body.

One apect of the disclosure provides a non-transitory recording medium containing a computer program. The computer program is configured to cause a processor to implement a method including: acquiring at least recognition area information and measurement result information from one or more environment recognizers outside a vehicle; and superimposing, when the one or more environment recognizers have detected a mobile body in an overlapping region between a blind spot area of the vehicle and a recognition area of the one or more environment recognizers, the recognition area information and information on the mobile body on map data, real space, or a captured image of the real space. According to the aspect, it is possible for a driver who drives the vehicle to clearly know how much area of the blind spot area the one or more environment recognizers have searched for the mobile body until the recognition of the mobile body in the blind spot area by the one or more environment recognizers. This urges the driver who drives the vehicle to be aware of a risk to be caused by the mobile body. Accordingly, even if the mobile body suddenly runs out into the area ahead of the vehicle in the traveling direction, for example, the driver is able to easily take action to avoid the mobile body.

One aspect of the disclosure provides a computer program configured to cause a processor to implement a method including: acquiring at least recognition area information and measurement result information from one or more environment recognizers outside a vehicle; and superimposing, when the one or more environment recognizers have detected a mobile body in an overlapping region between a blind spot area of the vehicle and a recognition area of the one or more environment recognizers, the recognition area information and information on the mobile body on map data, real space, or a captured image of the real space. According to the aspect, it is possible for the driver who drives the vehicle to clearly know how much area of the blind spot area the one or more environment recognizers have searched for the mobile body until the recognition of the mobile body in the blind spot area by the one or more environment recognizers. This urges the driver of the vehicle to be aware of the risk to be caused by the mobile body. Accordingly, even if the mobile body suddenly runs out into the area ahead of the vehicle in the traveling direction, for example, the driver is able to easily take action to avoid the mobile body.

According to any embodiment of the disclosure described above, it is possible to reduce the risk of contact with a mobile body caused when the driver who drives the vehicle places too much trust in the functionality of notifying a state of a blind spot area.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

The processing unit 103 illustrated in FIG. 5 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processing unit 103 illustrated in FIG. 5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processing unit 103 illustrated in FIG. 5.

The invention claimed is:

1. A driver assistance apparatus configured to assist driving of a vehicle, the driver assistance apparatus comprising:
   one or more processors; and
   one or more memories communicably coupled to the one or more processors, wherein
   the one or more processors are configured to
      acquire at least recognition area information and measurement result information from one or more environment recognizers outside the vehicle,
      when the one or more environment recognizers have detected a mobile body in an overlapping region between a blind spot area of the vehicle and a recognition area of the one or more environment recognizers, superimpose the recognition area information and information on the mobile body on map data, real space, or a captured image of the real space,
      when the one or more environment recognizers have detected no mobile body in the overlapping region, determine whether a mobile body possibly present on a second traveling road is likely to enter a merging point between a first traveling road on which the vehicle travels and the second traveling road merging into the first traveling road from an outside of the overlapping region at a time when the vehicle reaches the merging point, and
      refrain from superimposing the recognition area information on the map data, the real space, or the captured image of the real space when the mobile body possibly present on the second traveling road is determined to be likely to enter the merging point.

2. The driver assistance apparatus according to claim 1, wherein
   the one or more processors are configured to
   determine, when the one or more environment recognizers have detected no mobile body in the overlapping region, whether the mobile body possibly present on the second traveling road is likely to enter the merging point from the outside of the overlapping region at the time when the vehicle reaches the merging point, and superimpose the recognition area information on the map data, the real space, or the captured image of the real space when the mobile body possibly present on the second traveling road is determined to be unlikely to enter the merging point.

3. The driver assistance apparatus according to claim 1, wherein the one or more processors are configured to determine whether the mobile body possibly present on the second traveling road is likely to enter the merging point from the outside of the overlapping region at the time when the vehicle reaches the merging point, based on: a multiplication value obtained by multiplying a time necessary for the vehicle to reach the merging point by a predetermined moving speed; and a distance between the merging point and an outermost edge of the overlapping region defined with reference to the one or more environment recognizers set as a base point.

4. A driver assistance method of assisting driving of a vehicle, the driver assistance method comprising:
   acquiring at least recognition area information and measurement result information from one or more environment recognizers outside the vehicle;
   when the one or more environment recognizers have detected a mobile body in an overlapping region between a blind spot area of the vehicle and a recognition area of the one or more environment recognizers, superimposing the recognition area information and information on the mobile body on map data, real space, or a captured image of the real space;
   when the one or more environment recognizers have detected no mobile body in the overlapping region, determining whether a mobile body possibly present on a second traveling road is likely to enter a merging point between a first traveling road on which the vehicle travels and the second traveling road merging into the first traveling road from an outside of the overlapping region at a time when the vehicle reaches the merging point; and
   refraining from superimposing the recognition area information on the map data, the real space, or the captured image of the real space when the mobile body possibly present on the second traveling road is determined to be likely to enter the merging point.

5. A non-transitory computer readable recording medium containing a computer program to be applied to a driver assistance apparatus, the driver assistance apparatus being configured to assist driving of a vehicle, the computer program causing, when executed by one or more processors, the one or more processors to implement a method, the method comprising:
   acquiring at least recognition area information and measurement result information from one or more environment recognizers outside the vehicle;
   when the one or more environment recognizers have detected a mobile body in an overlapping region between a blind spot area of the vehicle and a recognition area of the one or more environment recognizers, superimposing the recognition area information and information on the mobile body on map data, real space, or a captured image of the real space;
   when the one or more environment recognizers have detected no mobile body in the overlapping region, determining whether a mobile body possibly present on a second traveling road is likely to enter a merging point between a first traveling road on which the vehicle travels and the second traveling road merging into the first traveling road from an outside of the overlapping region at a time when the vehicle reaches the merging point; and refraining from superimposing the recognition area information on the map data, the real space, or the captured image of the real space when the mobile body possibly present on the second traveling road is determined to be likely to enter the merging point.

\* \* \* \* \*